United States Patent

Nonaka et al.

[11] Patent Number: 5,134,984
[45] Date of Patent: Aug. 4, 1992

[54] FUEL INJECTION SYSTEM OF INTERNAL COMBUSTION ENGINE

[75] Inventors: Kimihiro Nonaka; Yukio Matsushita, both of Hamamatsu, Japan

[73] Assignee: Sanshin Kogyo Kabushiki Kaisha, Hamamatsu, Japan

[21] Appl. No.: 744,354

[22] Filed: Aug. 13, 1991

[30] Foreign Application Priority Data

Aug. 13, 1990 [JP] Japan .................. 2-211615

[51] Int. Cl.$^5$ .................. F02D 41/04; F02B 33/04
[52] U.S. Cl. .................. 123/494; 123/478; 123/73 C
[58] Field of Search .................. 123/73 R, 73 A, 73 C, 123/478, 494

[56] References Cited

U.S. PATENT DOCUMENTS

| | | | |
|---|---|---|---|
| 4,461,260 | 7/1984 | Nonaka et al. | 123/478 |
| 4,593,667 | 6/1986 | Sasaki et al. | 123/494 X |
| 4,671,242 | 6/1987 | Akiyama et al. | 123/494 X |
| 4,750,464 | 6/1988 | Staerzl | 123/494 |
| 4,903,649 | 2/1990 | Staerzl | 1223/73 A |
| 4,958,516 | 9/1990 | Stiles et al. | 123/478 |
| 4,987,773 | 1/1991 | Stiles et al. | 123/478 X |

FOREIGN PATENT DOCUMENTS 63-40257 8/1988 Japan .
2-4785 1/1990 Japan .

*Primary Examiner*—Willis R. Wolfe
*Attorney, Agent, or Firm*—Ernest A. Beutler

[57] ABSTRACT

This invention relates to a fuel injection apparatus for an internal combustion engine, and more particularly to an improved control arrangement for a fuel injection arrangement. In accordance with the invention, an arrangement is disclosed for determining the mass of air taken into the engine crankcase chamber by calculating an average intake air mass which is based not on pressure measurements taken upon each crankshaft rotation individually, but on the arithmetical mean of such pressure measurements taken during a plurality of crankshaft rotations. Thus, a fuel injection control system is achieved which senses differences in crankcase pressure and which eliminates the effects of abnormal changes in crankcase pressure due to effects other than the amount of air inducted.

16 Claims, 2 Drawing Sheets

FUEL INJECTION SYSTEM OF INTERNAL COMBUSTION ENGINE

BACKGROUND OF THE INVENTION

This invention relates to a fuel injection apparatus for an internal combustion engine and more particularly to an improved control arrangement for a fuel injection arrangement.

In fuel injected engines, it is, of course, extremely important to accurately control the quantity of fuel injected in accordance with the air inducted in order to achieve the optimum fuel/air ratio for a given operating condition of the engine. Various devices have been proposed for measuring the air flow in an induction system of an engine to control the amount of fuel injected. Conventionally, such air flow measuring devices have been large and complicated, and have been positioned in the induction system, normally upstream of the point of discharge of the fuel. In one type of flow detector, a flap type arrangement is provided in the intake passage and has a member that swings open to an amount that is determined by the air flow. The angular position of this detector is then measured and used to provide an air flow signal for the fuel injection system. Alternatively, vortex type air flow meters have been positioned in the induction system for determining air flow. Still another type of measuring device employs a hot wire anemometer which provides an electrical resistance wire interposed in the air stream to have its resistance vary in relation to the speed, i.e., cooling effect, of the air flowing through the induction system. The use of such flow meters in the induction system has several disadvantages.

In the first instance, the provision of an air flow measuring device in the induction system can oftentimes reduce the volumetric efficiency of the induction system. Furthermore, such devices substantially increase the size of the induction system. Also, devices of the type aforementioned are not particularly efficient with engines having a low number of cylinders or specifically with single cylinder engines due to the pulsations in the intake flow. Although such pulsations may be reduced to some extent through the use of a plenum chamber, this adds still further to the size of the induction system. Furthermore, if the flow meter is used in conjunction with the internal combustion engine of an outboard motor or other marine application, there is a high likelihood of corrosion in the moving components of the flow meter due to the salt in the atmosphere.

In U.S. Pat. No. 4,446,833 to Matsushita et al., and assigned to the assignee hereof, there is disclosed a control for a fuel injection system that has none of the foregoing disadvantages. The system disclosed in that patent senses the pressure in the crankcase of a two-cycle engine and uses the sensed pressure to control the amount of fuel injected. It has been found that the pressure in the crankcase is, if accurately measured, indicative of the amount of air inducted.

Although the arrangement shown in the '833 patent is particularly effective in controlling the amount of fuel injected without the disadvantages of the above-discussed air flow measuring devices, there are some instances when the crankcase pressure is not actually related to the amount of air inducted. For example, with two-cycle crankcase compression engines it has been found that the peak pressure immediately prior to the piston reaching bottom dead center is abnormally raised when the transfer or scavenge port is open due to the back flow of exhaust gases into the crankcase. As noted earlier, one desirable method for controlling the amount of fuel injected involves sensing both the minimum and maximum pressures in the chamber. However, since the maximum pressure is abnormally high due to the opening of the scavenge port and the back flow of exhaust gases, such a control arrangement is not as accurate as it might otherwise be.

Japanese Provisional Patent Publication Sho59-5875 discloses an engine wherein the air intake amount, for determining a proper amount of fuel for injection, is determined by making two separate pressure measurements during each crankshaft rotation. A value for the air intake amount is obtained by measuring the air pressure near the scavenging port opening timing, which is representative of the mass of the air remaining in the crank chamber at the beginning of the scavenging stroke; and, also, measuring the air pressure near the scavenging port closing timing, which is representative of the mass of the air remaining in the crank chamber at the termination of the scavenging stroke.

As discussed above, however, and particularly during low load, low speed operation, pressure from the combustion chamber may affect the pressure in the crank chamber when the scavenging port is opened. Thus, a temporary rapid rise in pressure may take place within the crank chamber. When this occurs, employing the crank chamber pressure value for determining the mass of the air inducted therein may cause a significant error in the value of the air intake amount calculated therefrom, which would result in decreased accuracy in arriving at the proper amount of fuel injection required.

It is, therefore, a principle object of this invention to provide an improved fuel flow control arrangement for the fuel injection system of an engine.

It is another object of this invention to provide an improved air flow measuring system of an internal combustion engine that accurately controls fuel flow in response to the amount of air flowing through the intake system.

It is yet a further object of this invention to provide a fuel control for a fuel injection system that does not rely upon a device that is interposed in the air induction system.

It is still a further object of this invention to provide a fuel injection system that senses differences in crankcase pressure and which eliminates the effects of abnormal changes in crankcase pressure due to effects other than the amount of air inducted.

SUMMARY OF THE INVENTION

A first feature of the invention includes a fuel injection arrangement for an internal combustion engine comprising a crankcase chamber and a rotatable crankshaft disposed within the crankcase chamber. Means are provided for inducting an air charge into the crankcase chamber during engine operation. And, further, means are provided for calculating an arithmetical mean air pressure value over a plurality of rotation cycles of the crankshaft within the crankcase chamber.

A second feature of the invention involves a method of controlling a fuel injection system for an internal combustion engine having a crankcase chamber, an induction system for delivering an air charge to the crankcase chamber, a combustion chamber, a scavenging passage for delivering the air charge from the crankcase chamber to the combustion chamber, and a fuel injection means for delivering an amount of fuel for mixing with the air charge. The method comprises the steps of measuring the air pressure within the crankcase chamber a predetermined number of times over a plurality of rotation cycles of the crankshaft within the crankcase chamber, calculating an arithmetical mean air pressure value from the air pressure measurements, and controlling the amount of fuel discharged by the fuel injection means in response to the calculated arithmetical mean air pressure.

DETAILED DESCRIPTION OF THE PREFERRED EMBODIMENT

Figure 1:
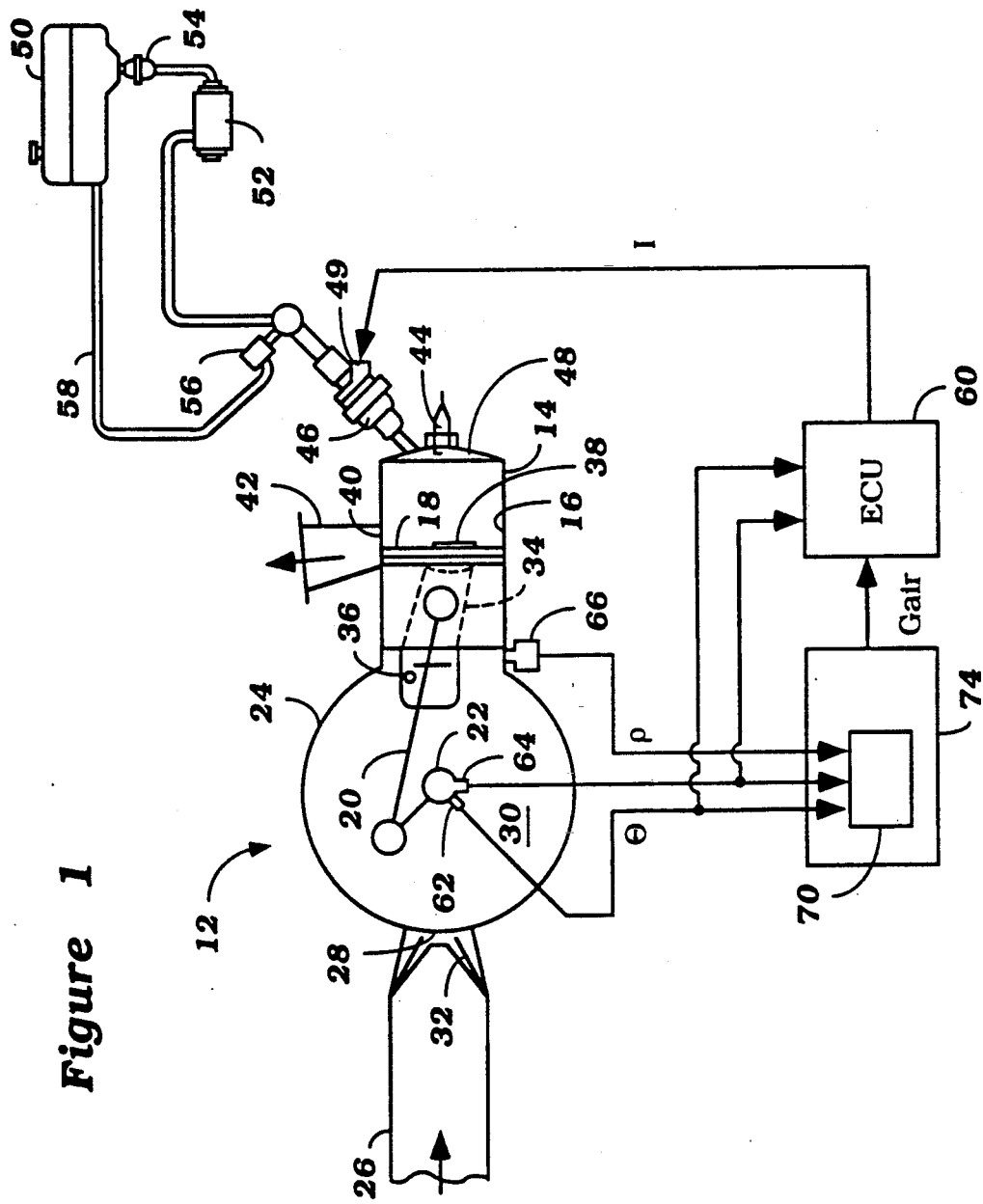
FIG. 1 is a partially schematic view of an internal combustion engine constructed in accordance with the invention.
Figure 2:
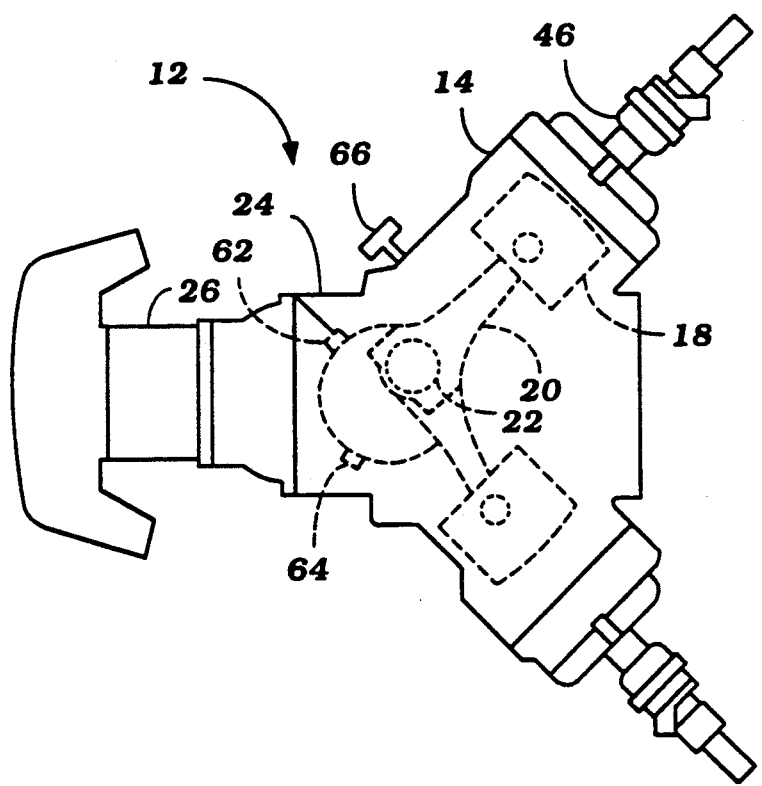
FIG. 2 is an enlarged elevational view, with portions shown in phantom, of the engine in accordance with the invention.

Referring now specifically to FIGS. 1 and 2, a two cycle, crankcase compression, internal combustion engine constructed in accordance with the invention is shown in part in cross-section and in part schematically, and is identified generally by the reference numeral 12. The engine 12 includes a cylinder block 14 having a cylinder bore 16 in which a piston 18 is supported for reciprocation in a known manner. The piston 18 is connected by means of a connecting rod 20 to a crankshaft 22 that is rotatably journaled in a known manner in a crankcase 24 of the engine 12.

The engine 12 includes an intake system that comprises an air induction passage 26 that terminates in an intake port 28 that sequentially communicates with a crankcase chamber 30 within the crankcase 24 when the piston 18 is above a certain predetermined position above its bottom dead center position. A reed type check valve 32 is positioned in the induction passage 26 so as to prevent undesirable reverse flow from the crankcase chamber 30 back into the induction system 26.

A transfer or scavenge passage 34 extends through the cylinder block 14 and terminates at an inlet opening 36 in the crankcase chamber 30. The upper end of the scavenge or transfer passage 34 terminates in an inlet scavenge port 38 formed in the cylinder wall 16 at a point above the bottom dead center position of the piston 18.

An exhaust port 40 is also formed in the cylinder bore 16 and communicates with an exhaust passage 42 for the discharge of exhaust gases to the atmosphere. The exhaust port 40 is positioned above the bottom dead center position of the piston 18 and is slightly higher in the cylinder bore 16 than the transfer or scavenge port 38.

A spark plug 44 is provided in the cylinder head of the engine 12 for firing a charge.

The engine 12 is provided with a fuel injection system that includes an injection nozzle 46 that discharges into a combustion chamber 48 within the head portion of the cylinder block 14. The injection nozzle 46 includes an electro-magnetic controller 49 that controls the amount of fuel discharged by the nozzle 46. Fuel is supplied to the nozzle 46 from a fuel tank 50 by means of an appropriate fuel pump 52. A fuel filter or strainer 54 is interposed in the conduit connecting the fuel tank 50 with the pump 52. A pressure control valve 56 is provided in the supply line to the fuel injection nozzle 46 and has a return line 58 that extends back to the fuel tank 50. The valve 56 insures that a substantially constant pressure of fuel is delivered to the injection nozzle 46.

During running of the engine 12, an intake air charge is delivered to the induction pipe 26 which is admitted to the crankcase chamber 30 when the piston 18 has moved upwardly so as to uncover the intake port 28. The reed valve 32 will be opened under this condition so long as the pressure upstream of it exceeds the pressure on its downstream side. At the same time the piston 18 is moving upwardly to induct the air charge into the crankcase chamber 30, the spent combustion products will be discharged through the exhaust port 40 and exhaust passage 42. The air charge, which charge has been compressed, is then transferred from the crankcase chamber 30 to the upper side of the piston 18 through the transfer or scavenge passage 34. Proximate to this event, a fuel charge is delivered into the combustion chamber via the injection nozzle 46. Thus a fuel/air charge is then present in the combustion chamber near to the spark plug 44 for firing, as is typical with engines operating on the two stroke principle.

The construction of the engine 12 as thus far described may be considered to be conventional. For that reason, further details of the construction of the engine are not believed to be necessary to enable those skilled in the art to practice the invention.

As has been noted in U.S. Pat. No. 4,446,833, accurate control of the amount of fuel injected by the nozzle is extremely important. In that patent, several embodiments are disclosed that provide fuel control in response to pressure in the crankcase chamber, which has been found to be an accurate indicator of the amount of air inducted. By controlling the amount of fuel injected by the nozzle in response to pressure in the crankcase chamber, it is possible to provide good fuel control without the disadvantages of air flow measurement devices positioned in the intake pipe, as have been previously employed.

One embodiment of the '833 patent provides fuel control by sensing the maximum and minimum pressures existent in the crankcase chamber and using the difference as a control signal indicative of the amount of air inducted. Such an arrangement has particular utility since this pressure difference if correctly measured is a very accurate measurement of air flow. However, it has been found that there are pressure variations occurring in the crankcase chamber that result from engine operation and which are not necessarily related to the amount of air inducted.

In accordance with this invention, an arrangement is disclosed for determining the air intake amount by calculating an average intake air weight which is based not on pressure measurements taken upon each crankshaft rotation individually, but instead upon the arithmetical mean of such pressure measurements taken during a plurality of crankshaft rotations.

Figure 3:
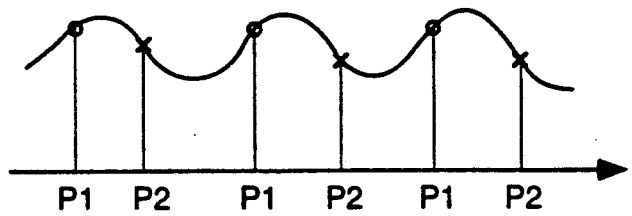
FIG. 3 is a curve illustrating the pressure in the engine crankcase chamber during each cycle of rotation of the crankshaft.

Referring to FIG. 3, a curve is shown that represents such a plurality of pressure measurements taken within the engine crankcase chamber during each cycle of rotation of the crankshaft. By utilizing the arithmetical mean of a plurality of pressure measurements within the crankcase chamber, the adverse effects of individual abnormal pressure readings, due to effects other than the amount of air inducted, upon fuel injection operations can be significantly reduced. Thus, a more reliable inducted air mass figure can then be employed in calculating, and carrying out, fuel injection operations.

The control arrangement for the fuel injection system of the invention will now be described. The fuel injector 46 is electronically controlled. For this purpose there is provided an electronic control unit (ECU), shown schematically in FIG. 1 and identified by the reference numeral 60, that receives a plurality of input signals indicative of engine conditions. These signals include a signal from a crank angle sensor 62 for sensing the angular position $\theta$ of the crankshaft 22 and a pulser coil 64 mounted around the crankshaft 22, which together function as a timing detecting means for detecting the timing, $\theta_{P1}$, of the opening of the scavenging port 36 and the timing, $\theta_{P2}$, of the closing of the scavenging port 36.

At these two timings $\theta_{P1}$ and $\theta_{P2}$, representative of the opening and closing of the scavenging port 36, two pressure measurements, P1 and P2, are made which correspond to the timings $\theta_{P1}$ and $\theta_{P2}$, respectively. These two pressure measurements are made by a pressure sensing device, indicated by the reference numeral 66, which is provided in the crankcase 24 for sensing the pressure in the crankcase chamber 30. The pressure measurements are subsequently sent to a pressure averaging system 70.

The pressure averaging system 70 calculates arithmetical mean values P1$_a$ and P2$_a$ of the crankcase chamber pressures P1 and P2, respectively, during n rotations of the crankshaft 22. The number of rotations of the crankshaft 22, n, is selected to be greater than, or equal to, two and less than, or equal to, ten. An air intake amount calculating system 74 next calculates the average intake air mass $G_{air}$ as G1-G2, where G1 and G2 are the air masses in the crankcase chamber 30 calculated from the arithmetical mean pressure values P1$_a$ and P2$_a$ at the timings $\theta_{P1}$ and $\theta_{P2}$. The average intake air mass $G_{air}$ is subsequently supplied to the ECU 60 for further processing.

In addition to the average intake air mass, crankcase angle and timing measurements transmitted to the ECU 60, various other inputs such as air temperature, engine temperature, acceleration, deceleration or other operating conditions can be provided so as to provide an appropriate control for the fuel discharge so as to achieve the desired fuel/air ratios throughout the engine running conditions. The ECU 60 then outputs an appropriate actuating signal I to the injector 46 to control the timing of the initiation of fuel injection and the fuel injection amount by varying the duration, or in other known manners.

While an effective fuel injection apparatus for an internal combustion engine, and more particularly an improved control arrangement for a fuel injection arrangement, has been described herein, it should be readily apparent to those skilled in the art that various changes and modifications may be made without departing from the spirit and scope of the invention, as defined by the appended claims.

It is claimed:

1. A fuel injection arrangement for an internal combustion engine comprising a crankcase chamber and a rotatable crankshaft, said crankshaft disposed within said crankcase chamber, and means for inducting an air charge into said crankcase chamber during engine operation; and, further, means for calculating an arithmetical mean air pressure value over a plurality of rotation cycles of said crankshaft within said crankcase chamber.

2. The fuel injection arrangement of claim 1 further comprising a fuel injection device for injecting fuel into said air charge; and means for controlling the amount of fuel delivered by said fuel injection device.

3. The fuel injection arrangement of claim 2 wherein said means for controlling the amount of fuel delivered by said fuel injection device is responsive to said arithmetical mean air pressure value.

4. The fuel injection arrangement of claim 3 wherein said means for calculating an arithmetical mean air pressure value over a plurality of rotation cycles of said crankshaft within said crankcase chamber comprises a pressure sensor positioned within said crankcase chamber.

5. The fuel injection arrangement of claim 4 further comprising a combustion chamber and a scavenging passage, said scavenging passage leading from said crankcase chamber to said combustion chamber; and a scavenging port, said scavenging port communicating said scavenging passage with said crankcase chamber.

6. The fuel injection arrangement of claim 5 further comprising a piston and a cylinder head, said piston reciprocal within said cylinder head; and wherein a portion of said piston blocks said scavenging port during a portion of its stroke, thereby temporarily closing said scavenging port; said scavenging port being opened when said piston does not block it.

7. The fuel injection arrangement of claim 6 wherein said pressure sensing device is positioned near to said scavenging port.

8. The fuel injection arrangement of claim 6 wherein said means for calculating an arithmetical mean air pressure value over a plurality of rotation cycles of said crankshaft within said crankcase chamber further comprises a crank angle sensor, positioned adjacent to said crankshaft, and a pulser coil, positioned about said crankshaft, said crank angle sensor and said pulser coil operative to determine timings at which said scavenging port is opened and at which said scavenging port is closed.

9. The fuel injection arrangement of claim 8 wherein said pressure sensing device is operative to measure said pressure within said crankcase at a time at which said scavenging port is opened, and also, at a time at which said scavenging port is closed.

10. The fuel injection arrangement of claim 9 wherein a predetermined number of pressure measurements are taken within said crankcase chamber at said scavenging port opening timing and said scavenging port closing timing, corresponding to a plurality of rotation cycles of said crankshaft within said crankcase chamber.

11. The fuel injection arrangement of claim 10 wherein said means for calculating an arithmetical mean air pressure value over a plurality of rotation cycles of said crankshaft within said crankcase chamber further comprises a pressure averaging system, wherein said predetermined number of pressure measurements are averaged, thereby providing an averaged pressure value corresponding to said scavenging port opening timing and an averaged pressure value corresponding to said scavenging port closing timing.

12. The fuel injection arrangement of claim 11 wherein said means for calculating an arithmetical mean air pressure value over a plurality of rotation cycles of said crankshaft within said crankcase chamber further comprises an air mass calculating system operational to receive said averaged pressure values in order to calculate an averaged intake air mass value based upon said averaged pressure values.

13. The fuel injection arrangement of claim 12 wherein said means for controlling the amount of fuel delivered by said fuel injection device comprises an electronic control unit; said electric control unit operable to receive various input signals, indicative of engine operating conditions, and to output a control signal for controlling said fuel injection device.

14. The fuel injection arrangement of claim 13 wherein said input signals include said averaged intake air mass value, and said scavenging port opening timing and said scavenging port closing timing.

15. The fuel injection arrangement of claim 14 wherein said predetermined number of pressure measurements taken at said scavenging port opening timing and said scavenging port closing timing, corresponding to said plurality of rotation cycles of said crankshaft within said crankcase chamber, is greater than or equal to two and less than or equal to ten.

16. A method of controlling a fuel injection system for an internal combustion engine having a crankcase chamber, an induction system for delivering an air charge to the crankcase chamber, a combustion chamber, a scavenging passage for delivering the air charge from the crankcase chamber to the combustion chamber, and a fuel injection means for delivering an amount of fuel for mixing with the air charge comprising the steps of measuring the air pressure within said crankcase chamber a predetermined number of times over a plurality of rotation cycles of said crankshaft within said crankcase chamber, calculating an arithmetical mean air pressure value from said air pressure measurements, and controlling the amount of fuel discharged by the fuel injection means in response to the calculated arithmetical mean air pressure.

* * * * *